No. 877,506.
PATENTED JAN. 28, 1908.
R. JOHNSON.
SPEED METER.
APPLICATION FILED DEC. 22, 1906.
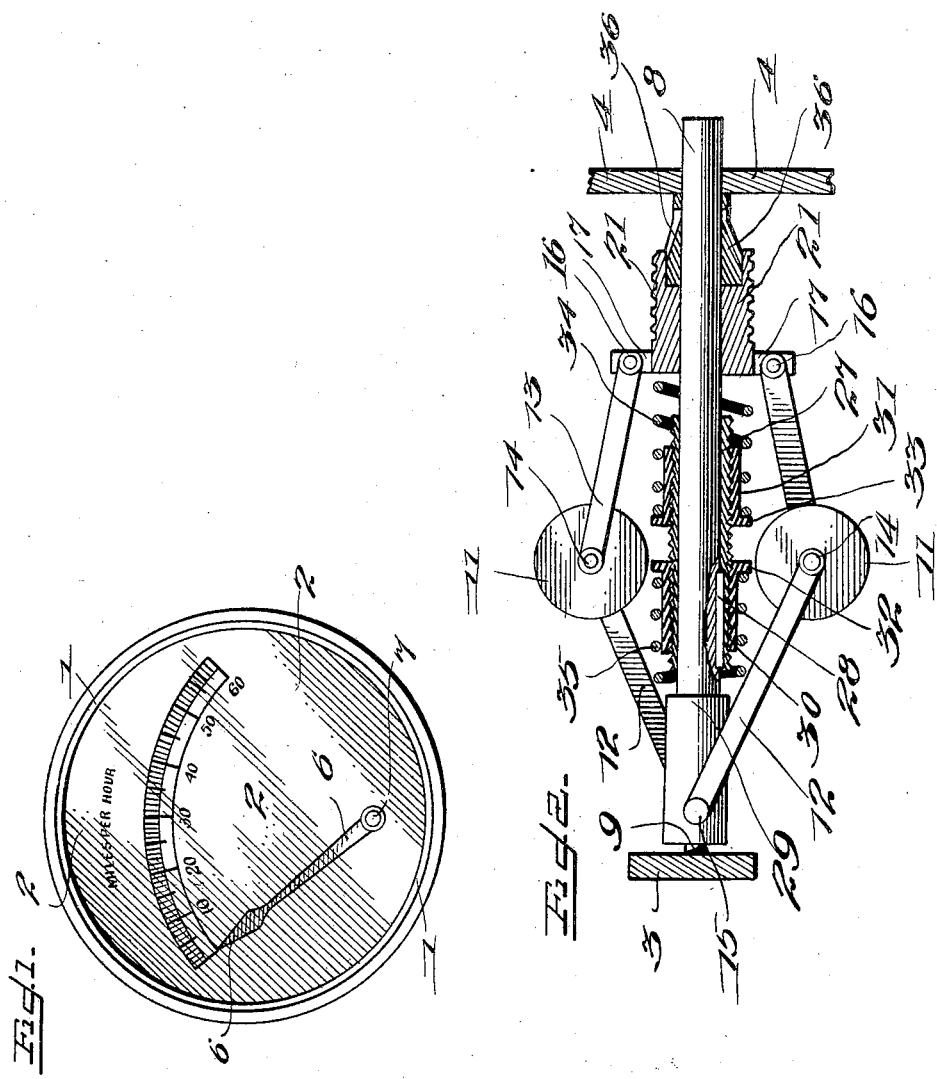
Witnesses:
Inventor
Ragnar Johnson
By his Attorneys
Mastick & Jones

UNITED STATES PATENT OFFICE.

RAGNAR JOHNSON, OF WORCESTER, MASSACHUSETTS, ASSIGNOR TO MILLER SPEED METER COMPANY, OF NEW YORK, N. Y., A CORPORATION OF NEW YORK.

SPEED-METER.

No. 877,506.        Specification of Letters Patent.        Patented Jan. 28, 1908.

Application filed December 22, 1906. Serial No. 349,153.

*To all whom it may concern:*

Be it known that I, RAGNAR JOHNSON, a subject of the King of Sweden, residing at Worcester, in the county of Worcester and State of Massachusetts, have invented a certain new and useful Improvement in Speed - Meters, of which the following is a specification.

My invention relates to apparatus for indicating the speed of a wheel or other part of a machine of the class known as speed meters or speed indicators. While my improved device is applicable in any situation wherein a speed meter may be advantageously employed it is especially designed for the purpose of measuring or indicating the speed of traveling vehicles and particularly in connection with automobiles and other rapidly traveling vehicles wherein it is desired that the speed should be measured or indicated.

In the following I have described, in connection with the accompanying drawings, one form of device illustrating my invention the features thereof being more particularly pointed out hereinafter in the claims.

In the drawings Figure 1 is a front elevation of my improved meter and Fig. 2 is an enlarged longitudinal sectional view, parts being broken away, of certain operating parts.

Similar numerals indicate similar parts throughout the several views.

1 is a cylindrical shell of metal or other suitable material within which the working parts of the meter are mounted and arranged and whereby they are protected from dust or other substances which would interfere with their reliable operation.

2 is a dial or scale plate secured in the front part of cylinder 1 in any suiatble manner on which is displayed suitable graduations substantially as indicated in Fig. 1, and adapted to the circumstances or conditions under which the meter is to be used.

3 and 4 are tie plates connecting the front and back plates of cylinder 1 and adapted to form bearings for certain parts, as hereinafter set forth. The front of the cylinder and the dial are adapted to be covered in the usual manner by a suitable glass which acts as a transparent protecting plate.

6 is a finger or pointer mounted on a rotatable shaft 7 journaled in bearings in the front and back plates of the cylinder.

8 is the main shaft of the meter one end of which is suitably journaled in bearings in tie plate 4 the other end being maintained in position by an adjustable pivot pin 9 supported in tie plate 3.

11, 11, are weights, preferably in the form of flat disks, suitably pivoted in arms 12, 12, and 13, 13, as by means of pins 14. Arms 12, 12, at the other end from weights 11, 11, are pivotally connected with shaft 8 by means of pin 15, and arms 13, 13, at the other end from weights 11, 11, are pivotally connected as by pins 16 with a movable collar 17 mounted on said shaft 8, the parts being so arranged that the rapid rotation of the shaft will compel the weights to swing out or away from the shaft and thus draw up the movable collar. The collar 17 may be provided with parallel bands or grooves 21 which encircle it and which may be adapted to actuate the indicator means (connections not shown) as the collar is moved up and down the shaft. The up and down movements of the movable collar cause the pointer to move upon the scale. The position of the pointer in respect to the scale at any time represents the speed of the main shaft and, therefore, the speed of the part with which the main shaft is connected and through which it is driven.

The main shaft 8 is provided with a sliding sleeve 27 splined on the shaft as at 28, one end of the shaft as 29 being enlarged to form a stop for the lengthwise movement of the sleeve. Sleeve 27 is preferably screw threaded throughout its entire length and provided with adjustable nuts 30 and 31 having flanged heads 32 and 33 respectively. A coiled spring 34 is carried on the shaft 8 between collar 17 and flange 33 of nut 31 and a coiled spring 35, preferably of less power than spring 34, is carried on shaft 8 between flange 32 of nut 30, and the enlarged portion 29 of the shaft.

The drawing up of collar 17 will first slightly compress spring 34 causing it to bear against the flange 33 of nut 31 and force sleeve 27 along shaft 8 thus compressing spring 35, of lesser power than spring 34 causing spring 35 to bear against enlarged portion 29. As the speed increases the power of resistance in spring 35 opposes the free outward movement of the weights until sleeve 27 contacts with enlarged portion 29 of shaft 8. The further upward movement of collar 17 will then serve to further compress spring 34 against flange 33 the power of resistance in spring 34 being opposed to the free outward movement of the weights as set forth.

The adjustable nuts 30 and 31 on shaft 8 serve as means for independently regulating and adjusting the tension of the springs which are adapted to bear against them and for thus regulating the device. For example, the spring 35 may be adjusted to indicate speeds up to sixty miles and after its power of resistance has been exhausted the spring 34 will continue to oppose the free outward movement of the weights and thus indicate the speeds above sixty miles. This principle of adjustment it is obvious may be utilized in connection with apparatus designed to indicate any desirable speed.

36 is a suitable pinion on shaft 8 for actuating any desirable form of registering apparatus (not shown).

It is obvious that the details of the device illustrated may be widely varied without departing from the principle of my invention and I do not restrict myself to any of the details as shown and described.

What I claim and desire to secure by Letters Patent is:—

1. In an apparatus of the character described, a shaft, a collar and a sleeve movable on said shaft, a plurality of adjustable nuts on said sleeve, means on said shaft to limit the movement of the sleeve in one direction, a spring adapted to bear against said collar and one of said adjustable nuts and another spring adapted to bear against another of said adjustable nuts and the limiting means on the shaft.

2. In an apparatus of the character described, a shaft, a collar and a sleeve movable on said shaft, a plurality of adjustable nuts on said sleeve, means on said shaft to limit the movement of the sleeve in one direction, a spring adapted to bear against said collar and one of said adjustable nuts and another spring of lesser power than the former adapted to bear against another of said adjustable nuts and the limiting means on the shaft.

3. In an apparatus of the character described, a shaft, a collar and an exteriorly screw threaded sleeve movable on said shaft, nuts on said sleeve adjustable towards and away from each other, means on said shaft to limit the movement of the sleeve in one direction, a spring adapted to bear against said collar and one of said adjustable nuts and another spring of lesser power than the former adapted to bear against the other of said adjustable nuts and the limiting means on the shaft.

In testimony whereof I have hereunto signed my name in the presence of two subscribing witnesses.

RAGNAR JOHNSON.

Witnesses:
SEABURY C. MASTICK,
ALFRED B. WHITE.